United States Patent
Higdon et al.

(10) Patent No.: US 9,145,918 B2
(45) Date of Patent: Sep. 29, 2015

(54) SPLIT CAGE FOR A BEARING

(71) Applicant: Schaeffler Technologies GmbH & Co. KG, Herzogenaurach (DE)

(72) Inventors: Kate Higdon, Birmingham, MI (US); Jeffrey Shewell, Rochester, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/243,221

(22) Filed: Apr. 2, 2014

(65) Prior Publication Data

US 2014/0301683 A1 Oct. 9, 2014

Related U.S. Application Data

(60) Provisional application No. 61/808,522, filed on Apr. 4, 2013.

(51) Int. Cl.
*F16C 33/46* (2006.01)
*F16C 19/46* (2006.01)

(52) U.S. Cl.
CPC ......... *F16C 33/4694* (2013.01); *F16C 33/4623* (2013.01); *F16C 33/4629* (2013.01); *F16C 33/4635* (2013.01); *F16C 19/463* (2013.01); *F16C 2361/53* (2013.01)

(58) Field of Classification Search
CPC ............. F16C 33/4694; F16C 33/4629; F16C 33/4635
See application file for complete search history.

(56) References Cited

U.S. PATENT DOCUMENTS

| 3,399,008 A | 8/1968 | Farrell et al. |
| 3,881,790 A * | 5/1975 | Ryanen .................... 384/576 |
| 4,004,840 A | 1/1977 | Johnston et al. |
| 4,881,830 A * | 11/1989 | Shepard et al. ............... 384/577 |
| 5,154,401 A | 10/1992 | Schramm et al. |
| 6,247,847 B1 | 6/2001 | Lob |
| 8,944,696 B2 * | 2/2015 | Ishibashi ....................... 384/576 |
| 2012/0275741 A1* | 11/2012 | Ishibashi ....................... 384/572 |
| 2013/0266250 A1 | 10/2013 | Brown |
| 2013/0308890 A1* | 11/2013 | Steblau ........................ 384/577 |

FOREIGN PATENT DOCUMENTS

| DE | 102011005407 A1 | 9/2012 |
| JP | 000H0893771 | 4/1996 |
| JP | 002008014441 | 7/2006 |
| JP | 002007247856 | 9/2007 |
| JP | 002008286232 | 11/2008 |
| JP | 002011089612 | 5/2011 |
| JP | 002012149755 | 8/2012 |
| WO | 03087600 | 10/2003 |

OTHER PUBLICATIONS

German Search Report for DE10 20014 202789.6, mailed Nov. 13, 2014 by German Patent and Trademark Office.

* cited by examiner

*Primary Examiner* — Thomas R. Hannon
(74) *Attorney, Agent, or Firm* — Antun M. Peakovic

(57) ABSTRACT

A split rolling element guide for a bearing assembly for a balance shaft of an internal combustion engine, having two axial support faces and a plurality of axial cross members defining rolling element pockets. A plurality of radial cutouts at each pocket increase flexibility of the cage and allow for greater opening of the cage at the split portion.

12 Claims, 6 Drawing Sheets

SPLIT CAGE FOR A BEARING

TECHNICAL FIELD

Example aspects described herein relate to bearing assemblies, particularly of bearing rolling element guides or cages, and more particularly, for balance shaft bearings for balance shafts in internal combustion engines.

BACKGROUND

Bearing assemblies are typically circular in shape, and generally comprise rolling elements sandwiched between raceways in bearing rings. Rolling elements take many forms, including spherical balls, rollers or various other configurations, such as cone-shaped tapered rollers or barrel-shaped spherical rollers. Bearing rolling element guides, or cages, retain rolling elements within a bearing assembly, while typically allowing for free rotation of the rolling elements within the cages, and rotation of the cages within the bearing assembly. Cages can be used to separate rolling elements from each other, generally at equal intervals, and hold rolling elements in alignment with respect to the bearing rings. Depending on the structure of the bearing, or the bearing design, cages may be linear or circular and made from a variety of materials, including, but, not limited to brass, steel, and various types of plastic.

In some applications, such as for balance shafts for internal combustion engines, a rolling element and cage assembly can be used without discrete bearing rings, with the balance shaft and surrounding engine housing or block acting as inner and outer raceways, respectively. In other words, rolling element raceways are integrally formed on the outer diameter of the balance shaft and the inner diameter of the balance shaft housing or block, respectively. In this form, the cage retains the rolling elements within the cage pockets during assembly and operation.

Broadly, there are two main types of bearing cages; "crown" or "snap" cages; and "ribbon" or "riveted" cages. The "snap" type has an annular side member and axial partitions projecting from said member. These partitions are typically parallel to each other and have open rolling element pockets, allowing said rolling elements to seat or "snap" into position within these open pockets. The "riveted" type is comprised of two pieces or halves, each half with an open pocket to accommodate a rolling element. The halves are assembled on opposite sides of the rolling element, the pockets surrounding the rolling elements, and contact at land surfaces at intervals between rolling elements, then are joined together at the mating surface using various types or fastening elements, such as rivets. When rolling element bearings are used in balance shafts, typically cages of the "snap" type are used.

Cages are guided by one of the available surfaces between the inner and outer rings. Cages may be guided by the inner land or surface, wherein, the cage's bore slides, or is guided by, the outer diameter of the inner ring. They may also be guided by the outer land, wherein, the cage's bore slides, or is guided by, the inner diameter of the outer ring. Finally, cage's may touch neither ring, and be guided by the rolling elements themselves.

Some example bearing cages are shown in U.S. Pat. Nos. 6,247,847, 5,154,401 and 4,004,840.

Different types and sizes of bearings require specifically designed bearing cages, taking into account bearing assembly size, operating conditions, and rolling element size, among other factors. It is understood that a particular design of bearing may incorporate a type of cage, but, may require variations in the cage to accommodate the specific bearing, for example choice of rolling element or material used. In balance shaft applications, the balance shaft has a number of diameter variations along its length as a result of balancing masses and mounting features on the balance shaft that prevent a bearing or cage and rolling element assembly from sliding along a length of the shaft during assembly. Therefore, the cage and rolling element assembly is typically wrapped around the shaft, which, in turn requires that the cage be separable and flexible, in order to return to its required cylindrical form. A cage with increased flexibility is needed.

SUMMARY OF THE INVENTION

A new design for a bearing cage is disclosed. In one example embodiment of the invention, the cage comprises cutout features around an internal circumference of the cage, on at least one axial end of the cage.

In another example embodiment of the invention, the cage comprises cutout features at alternating positions along an inner and outer circumference of the cage, on at least one axial end of the cage.

In a further embodiment of the invention, the cage comprises cutout features at alternating positions along an inner and outer circumference of the cage, on at least one axial end of the cage with the relative diameter of the cutout features decreasing as the distance from the separatable cage feature increases.

In a further embodiment of the invention, the cage comprises cutout features around an external or internal circumference of the cage, with the diameter of the cutout features decreasing as the distance from the separatable cage feature increases.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner. "Cage" and "rolling element guides" are used interchangeably.

Figure 1A:
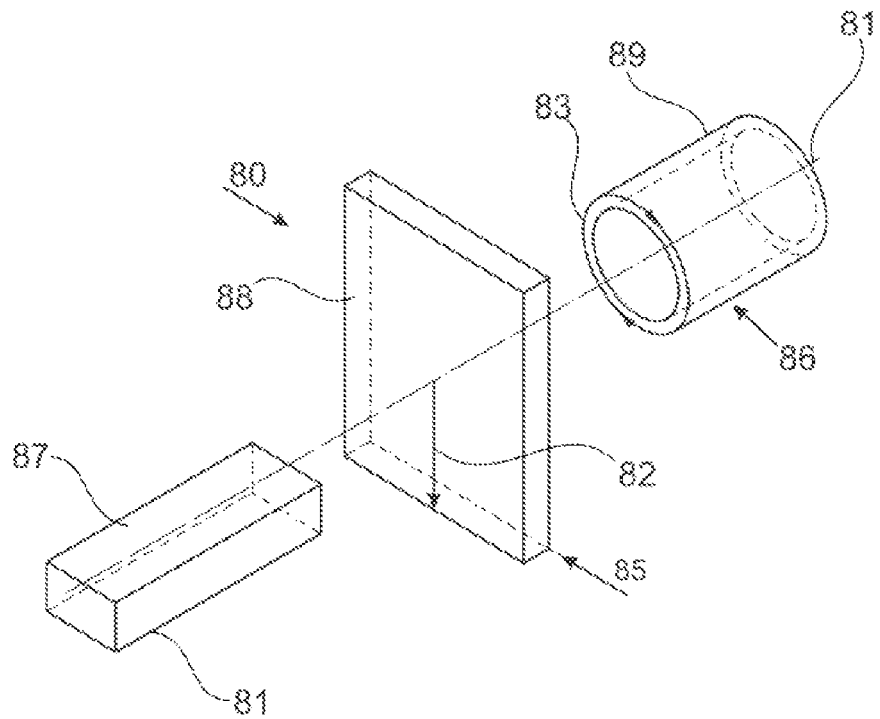
FIG. 1a is a perspective view of a cylindrical coordinate system demonstrating spatial terminology used in the present application.

FIG. 1a is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
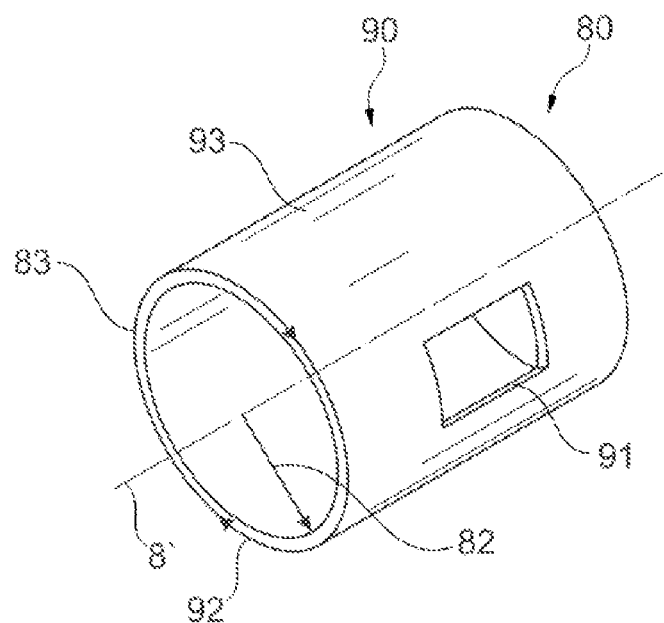
FIG. 1b is a perspective view of an object in the cylindrical coordinate system of FIG. 1a demonstrating spatial terminology used in the present application.

FIG. 1b is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
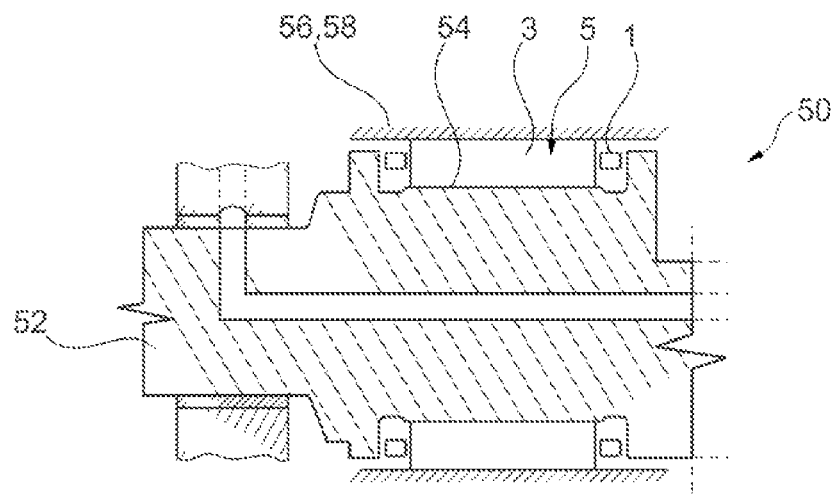
FIG. 2 is a cross sectional view of a prior art balance shaft system, with a cage and rolling element assembly thereon.

FIG. 2 is a cross sectional view of a prior art balance shaft system 50, comprising balance shaft 52 supported by at least one bearing journal 54 in a housing or block 56 of the internal combustion engine 58. The balance shaft 52 is supported via two bearing journals 54 in the housing 56 via rolling bearing assembly 5, preferably in the form of needle bearings that have rolling elements 3, such as rollers or needles, held in place via bearing cages 1. The rollers or needles preferably contact the bearing journals 54 which form the inner bearing races directly on the inner side and may be supported on their radially outer sides by an outer race (not shown) or the housing 56 that supports the balance shafts 52.

Figure 3:
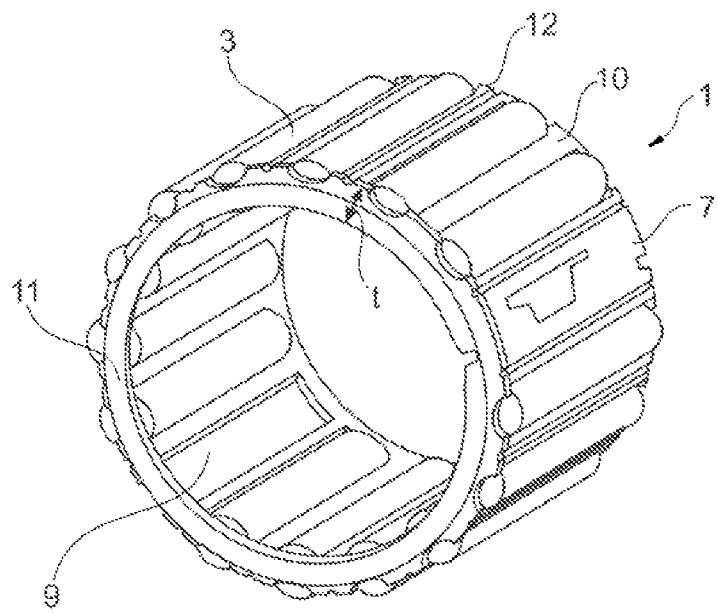
FIG. 3 is a perspective view of a prior art cage and rolling element assembly.
Figure 4:
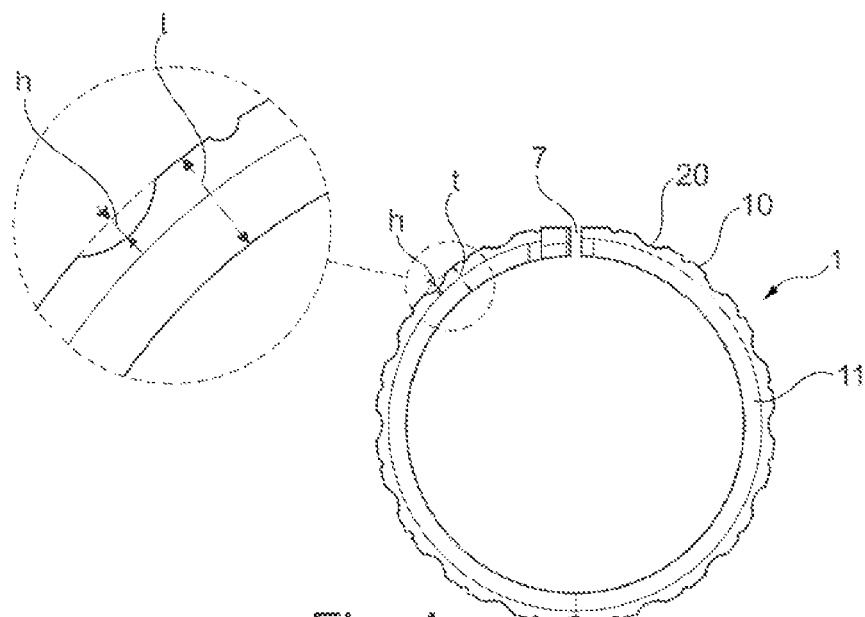
FIG. 4 is a front axial view of the prior art cage and rolling element assembly of FIG. 3.

The following description should be viewed with regard to FIGS. 3 and 4. FIG. 3 is a perspective view of prior art bearing assembly 5 of FIG. 2, comprising cage 1 and rolling elements 3 held in place and separated from each other by cage 1. Cage 1 comprises separable locking feature 7, which may take several forms, including the "tongue and groove" embodiment shown, and rolling element pockets 9. Pockets 9 are formed by parallel cross members 10 extending axially from one axial support face 11 to the opposite axial support face 12. Shallow cutouts 20 are formed in axial support faces 11, 12 at axial opposed ends of rolling elements 3 and at each rolling element 3, along an entire outer circumference of cage 1. Cutouts 20 are shown as circular segments defined by a height h, no greater than 50% the thickness t of cage 1. In the embodiment shown, height h is no more than 33% that of thickness t.

Figure 5:
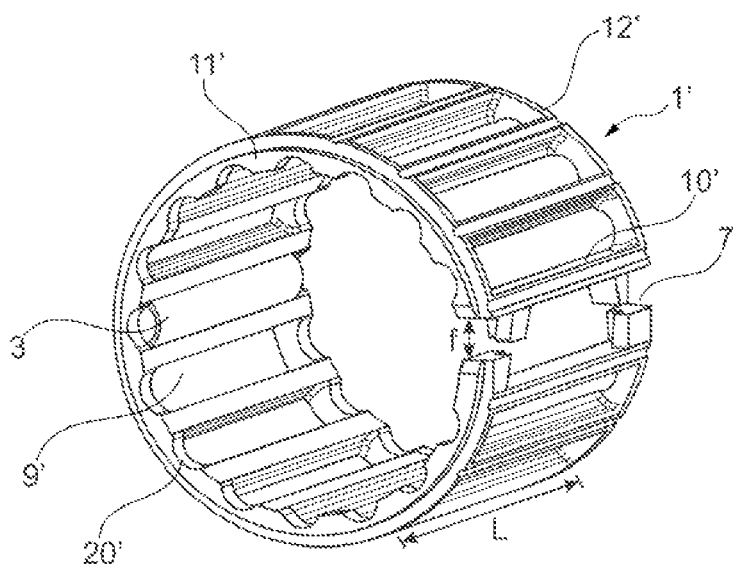
FIG. 5 is a perspective view of a bearing cage according to an example embodiment of the invention.

FIG. 5 is a perspective view of a bearing cage 1' according to an example embodiment of the invention, comprising cross members 10', extending axially between support faces 11', 12' and defining pockets 9', and cutouts 20'. Cutouts 20' are at axial opposed ends of rolling elements 3 and at each rolling element 3, along an entire inner circumference of cage 1'. Cutouts 20' are shown as circular segments defined by a height h, no greater than 50% the thickness t of cage 1. In the embodiment shown, height h is no more than 50% that of thickness t. It is understood that actual dimensions of the cage, rolling elements and cutouts will vary according to the requirements of any particular design. However, in an example cage design having axial length L of 30 mm, and an inner diameter d of 32 mm (see FIG. 7), Table 1 shows the gap height f between ends of separable locking feature 7 resulting in a change in cutout location.

TABLE 1

| Cutouts on outer circumference | Cutouts on inner circumference |
| --- | --- |
| 25 mm | 30.7 mm |

As a result of the improved flexibility, a particular cage and rolling element assembly can be installed radially onto a larger diameter balance shaft than prior art cage and rolling element assemblies.

Figure 6:
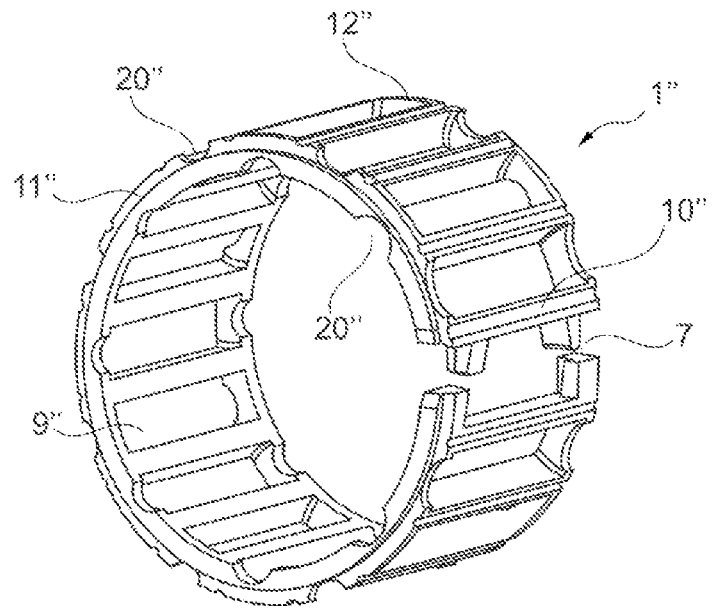
FIG. 6 is perspective view of a bearing cage according to another example embodiment of the invention.
Figure 7:
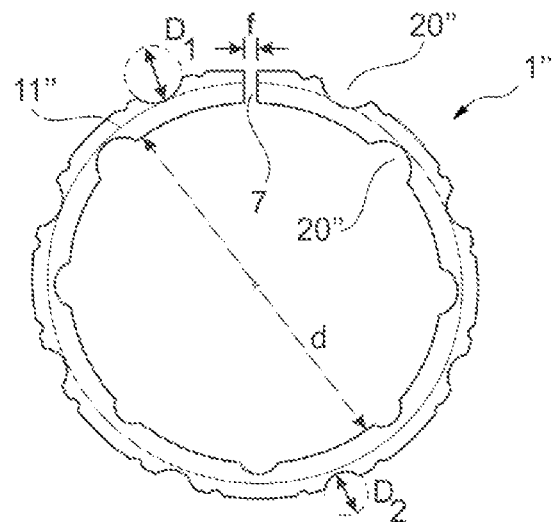
FIG. 7 is a front axial view of the bearing cage of FIG. 6.

FIGS. 6 and 7 are perspective and axial views, respectively, of another example embodiment of the invention. Cage 1" comprises axial support faces 11", 12", cross members 10" extending axially from one support face to the other and defining pockets 9", and cutouts 20". Cutouts 20" are at axial opposed ends of rolling elements 3 (not shown) and at each rolling element 3 (not shown), and are alternated from an inner circumferential position to an outer circumferential position, such that no two adjacent pockets 9" have cutouts 20" at the same radial position. In addition, diameter D of cutouts 20" vary as the distance from separable locking feature 7 increases. In particular, diameter D2 of cutouts 20" is less than diameter D1 of cutouts 20", such that the circumferential diameter gradually decreases as the distance from separable feature 7 increases.

Figure 8:
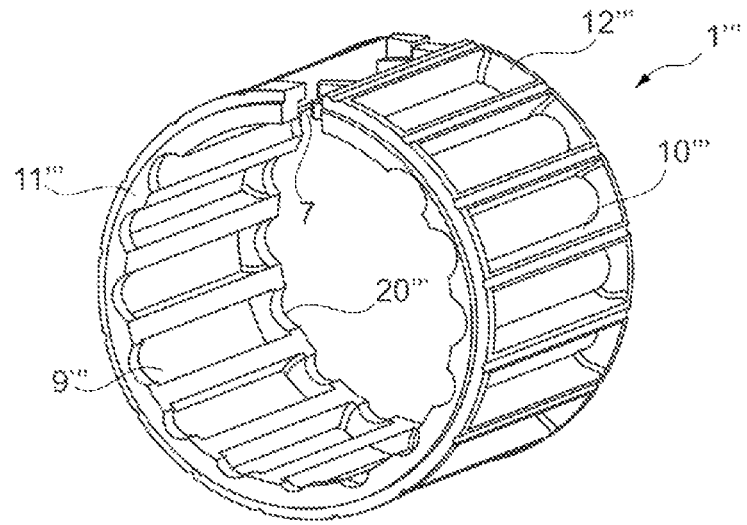
FIG. 8 is a perspective view of a bearing cage according to a further example embodiment of the invention.
Figure 9:
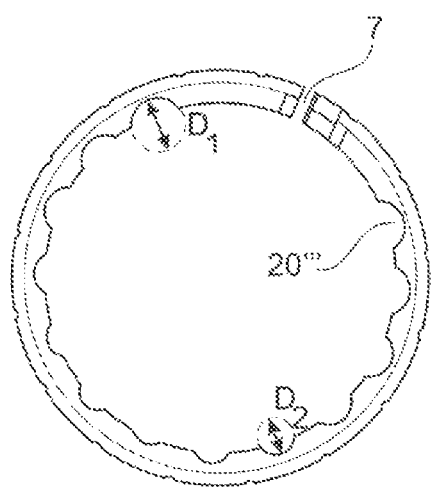
FIG. 9 is a front axial view of the bearing cage of FIG. 8.

FIGS. 8 and 9 are a perspective view and front axial view, respectively, of a further embodiment of the invention. Cage 1''' comprises axial support faces 11''', 12''', cross members 10''' extending axially from one support face to the other and defining pockets 9''', and cutouts 20'''. Cutouts 20''' are at axial opposed ends of pockets 9''' and at each pocket 9''', along an entire inner circumference of cage 1'''. In addition, diameter D of cutouts 20''' varies as the distance from separable locking feature 7 increases. In particular, diameter D2 of cutouts 20''' is less than diameter D1 of cutouts 20''', such that the diameter gradually decreases as the circumferential distance from separable feature 7 increases.

Figure 10:
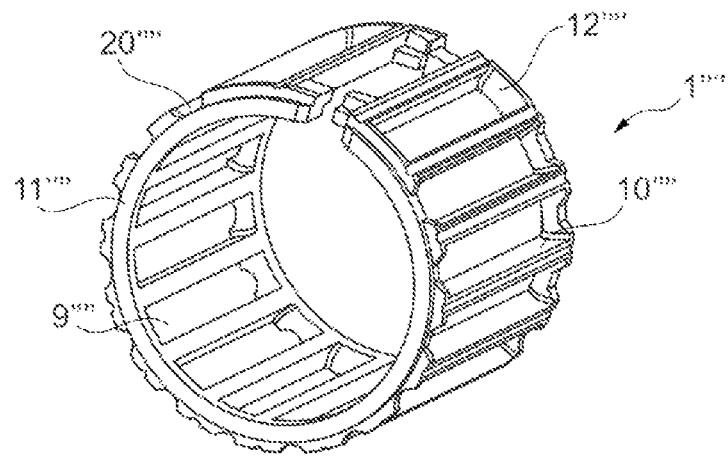
FIG. 10 is a perspective view of a bearing cage according to a further example embodiment of the invention.
Figure 11:
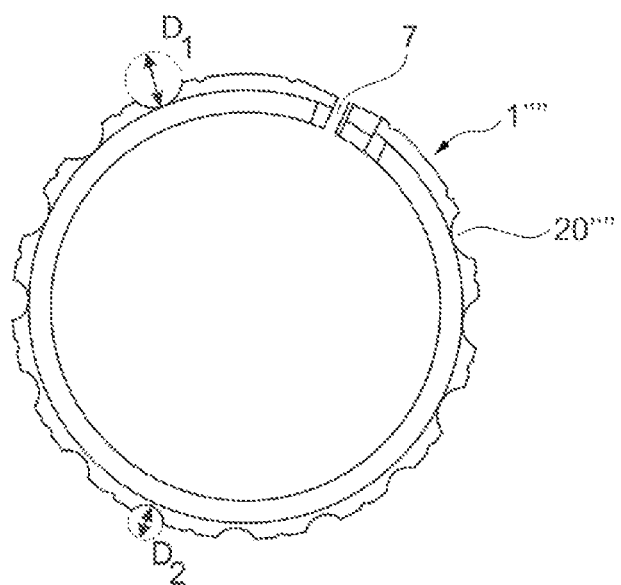
FIG. 11 is a front axial view of the bearing cage of FIG. 10.

FIGS. 10 and 11 are a perspective view and front axial view, respectively, of a further embodiment of the invention. Cage 1'''' comprises axial support faces 11'''', 12'''', cross members 10'''' extending axially from one support face to the other and defining pockets 9'''', and cutouts 20''''. Cutouts 20'''' are at axial opposed ends of pockets 9'''', and at each pocket 9'''' along an entire outer circumference of cage 1''''. In addition, diameter D of cutouts 20'''' varies as the distance from separable locking feature 7 increases. In particular, diameter D2 of cutouts 20'''' is less than diameter D1 of cutouts 20'''', such that the diameter gradually decreases as the circumferential distance from the separable feature 7 increases.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

What we claim is:

1. A bearing assembly for a balance shaft of an internal combustion engine:
   a split cage;
   a plurality of rolling elements retained by said cage;
   said cage having;
      a circular body having an inner and outer surface, defining a thickness of material of the cage;
   opposing axial support faces;
   a plurality of rolling element pockets in said body defined by adjacent members, for retention of said rolling elements;
   a plurality of cutouts at a radial surface in each of the axial support faces adjacent each of the pockets; and
   the cutout defined by a circular segment; having a height no greater than half the thickness of the cage;
      wherein the diameter of the circular segment defining the cutouts varies as the circumferential distance from the split portion of the cage increases.

2. The assembly of claim 1, wherein said cage is made of a material selected from the group consisting of plastic, steel and bronze.

3. The assembly of claim 1, wherein there is a lockable feature at the split portion of the cage.

4. The assembly of claim 1, wherein the cutouts extend around an inner radial circumference of the cage.

5. The assembly of claim 1, wherein the diameter of the circular segment defining the cutouts decreases as the circumferential distance from the split portion of the cage increases.

6. A bearing assembly for a balance shaft of an internal combustion engine:
   a split cage;
   a plurality of rolling elements retained by said cage;
   said cage having;
      a circular body having an inner and outer surface, defining a thickness of material of the cage;
   opposing axial support faces;
   a plurality of rolling element pockets in said body defined by adjacent members, for retention of said rolling elements;
   a plurality of cutouts at a radial surface in each of the axial support faces adjacent each of the pockets;
      wherein the cutouts alternate from an inner to an outer radial circumference of the cage, such that no two adjacent pockets have a cutout on the same radial surface.

7. A rolling element guide for a bearing assembly comprising:
   a circular body having an inner and outer surface, defining a thickness of material of the cage;
   opposing axial support faces;
   a plurality of axial cross members extending from one axial support face to an opposing support face;
   a plurality of rolling element pockets in said body defined by adjacent cross members;
   a plurality of cutouts at a radial surface in each of the axial support faces adjacent each of the pockets; and
   the cutout defined by a circular segment; having a height no greater than half the thickness of the cage;
      wherein the diameter of the circular segment defining the cutouts varies as the circumferential distance from the split portion of the cage increases.

8. The assembly of claim 7, wherein said cage is made of a material selected from the group consisting of plastic, steel and bronze.

9. The assembly of claim 7, wherein there is a lockable feature at the split portion of the cage.

10. The assembly of claim 7, wherein the cutouts extend around an inner radial circumference of the cage.

11. The assembly of claim 7, wherein the diameter of the circular segment defining the cutouts decreases as the circumferential distance from the split portion of the cage increases.

12. The assembly of claim 7, wherein the cutouts alternate from an inner to an outer radial circumference of the cage, such that no two adjacent pockets have a cutout on the same radial surface.

* * * * *